E. A. SPERRY.
GYROSCOPE.
APPLICATION FILED OCT. 11, 1917.
1,393,845.
Patented Oct. 18, 1921.
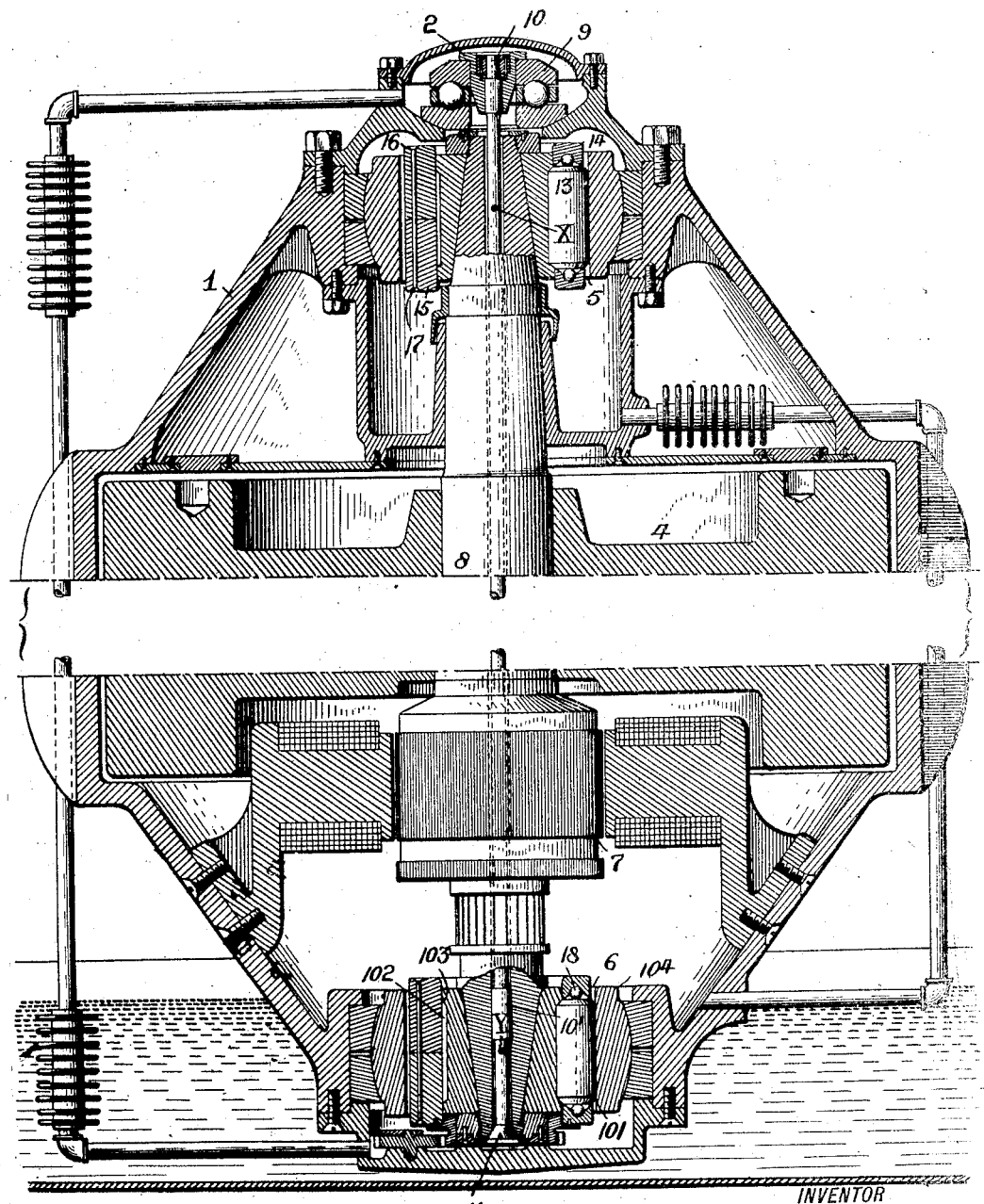
INVENTOR
Elmer A. Sperry.
BY
Herbert H. Thompson
ATTORNEY

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPE.

1,393,845.  Specification of Letters Patent.  Patented Oct. 18, 1921.

Original application filed January 25, 1916, Serial No. 74,075. Divided and this application filed October 11, 1917. Serial No. 195,901.

*To all whom it may concern:*

Be it known that I, ELMER A. SPERRY, a citizen of the United States of America, residing at 1505 Albermarle road, Brooklyn, in the county of Kings and State of New York, have invented certain new and useful Improvements in Gyroscopes, of which the following is a specification.

This invention relates to means for rotatably supporting elements of comparatively great weight being especially applicable to heavy machinery rotating on a substantially vertical axis, such as vertical gyroscopes, turbo-generators and hydro electric machinery.

While my invention is capable of broad application, I will, for the sake of simplicity, confine the present disclosure to the application of the system to a gyroscope.

Owing to the comparatively large mass and operating speed of gyroscopic rotors the problem of suitably journaling them becomes extremely difficult. Thus if ordinary thrust bearings are employed the latter do not respond quickly enough to lateral deflection of the rotor shaft so that chattering results. One of the principal objects of the present invention is to provide an arrangement of bearings to avoid this action.

Another object is to provide a system of bearings which will operate without throwing undue strains on the parts when the bearings are out of alinement.

Other objects and advantages will appear as the invention is hereinafter developed.

Referring to the drawings which illustrate what I now consider the preferred form of my invention.

An enlarged vertical section of a gyroscope with my invention applied thereto is shown.

The gyroscope, as shown, comprises a rotor bearing frame 1, adapted to be supported for precession in any suitable manner. The rotor 4 is journaled in radial bearings 5 and 6 and may be driven by any suitable means such as the armature 7 of an electric motor which may be built directly on the shaft of the rotor as indicated in the figure.

The radial bearings 5 and 6 are each preferably mounted for universal movement about their centers X and Y as shown and are each preferably so constructed as to support no part of the weight of the rotor 4.

A very satisfactory type of radial bearing is shown in the figure. Rollers 13 are supported in a cage or retainer 14 which comprises a plurality of sections 15 and 16 riveted or otherwise secured together between the rollers as indicated at 17. Small balls 18 are interposed between the ends of the rollers and the cage to reduce friction at these points. The ends 101 of the rollers are preferably beveled and one of the races 103, preferably the inner is provided with an annular depression 102 in which the rollers rest. The outer race 104, however, has no depressed portion so that the rollers are free longitudinally. It will be seen from the construction above described that the end walls of depression 102 will prevent any thrust which may be imparted to rollers 13 from being transmitted to balls 18.

Among other advantages, it will be readily appreciated that the above described bearing construction possesses the following. Assembly of parts is facilitated, expansion and contraction of the rotor shaft is practically unimpeded, the bearings support none of the weight of the rotor and the shaft of the rotor is free to bend about points X and Y, the bearings 5 and 6 alining themselves accordingly.

For supporting the weight of the rotor a thrust bearing is provided. While this bearing might be mounted at the lower end of the rotor shaft 8 I have found such an arrangement to possess certain objections and I have therefore not illustrated it but have illustrated a preferred form of means for supporting the rotor. The objections above mentioned are chiefly due to the difficulty in maintaining true alinement and may be best understood by considering what would happen if a thrust bearing were placed at the lower end of shaft 8 and the latter tended to turn about point Y in a vertical plane. The bearings 5 and 6, being self alining, would permit movement of the shaft but the thrust bearing would greatly impede, if not prevent, movement of the lower end of shaft 8 thus causing the latter to bend, giving rise to chattering, excessive strains on the parts, etc.

I overcome the above objections by providing a flexible supporting member between the rotor and its bearing frame 1. While this flexible member might be so designed as to support the rotor as a compression member I prefer to use the arrangement shown in which the flexible member 10 pendulously supports the rotor and instead of providing the thrust bearing at the bottom, as is usually the practice, I prefer to locate it at the upper end of the gyroscope thus not only rendering it easily accessible, but permitting the use of a long flexible tension member.

The thrust bearing 9, preferably of the anti-friction type and preferably universally supported at the top of casing 1 is adjustably connected to the flexible member 10 adjacent the upper end of the latter as by means of a nut 2. The member 10 is shown as passing through the shaft 8, which is made hollow for that purpose, sufficient clearance being provided to allow the said member to bend. The point of connection between the lower end of the last mentioned member and the shaft 8 may be placed at various positions but is preferably located at the bottom of said shaft in order to employ the greatest possible length of rod and thus obtain maximum flexibility. The entire weight of the rotor is supported by the lower end of the flexible rod 10 which is flared at 11 for that purpose, the enlarged portion 10' being provided merely for the purpose of centering the rod.

The system of bearings above described is very flexible and obviates not only the objections previously referred to, but also the necessity of extremely accurate alinement of the bearings.

It will be seen that the flexible rod 10 supports substantially the whole weight of said rotor while the radial bearings 5 and 6 receive practically all of the rotational forces and practically none of the weight of the rotor.

The system of lubrication and cooling of the bearings is not described as it forms no part of the present invention, being described and claimed in my companion application, Serial Number 74075 filed January 25th, 1916 and of which this application is a division.

Having described my invention what I claim and desire to secure by Letters Patent is:

1. In combination, a rotor, a flexible member for normally supporting the major portion of the weight of said rotor and a plurality of radial bearings for transmitting the rotational forces of said rotor.

2. In combination, a rotor, a radial bearing therefor, the shaft of said rotor being longitudinally slidably mounted in said radial bearing and means comprising a flexible rod for preventing sliding movement of said shaft through said bearing in at least one direction parallel to the axis of the rotor.

3. In combination, a rotor element, a supporting element, a thrust bearing comprising a part supported by one of said elements, a flexible member connected to the other of said elements, a connection between another part of said thrust bearing and said flexible member and a plurality of radial bearings for the shaft of said rotor.

4. In combination, a rotor, a shaft for said rotor having a central recess and a flexible rod at least a portion of which extends into said recess, for normally supporting substantially all of the weight of said rotor.

5. In combination, a rotor, a shaft for said rotor having a central recess, a flexible rod at least a portion of which extends into said recess, for normally supporting substantially all of the weight of said rotor and a plurality of radial rotor bearings for receiving the rotational forces of said rotor.

6. In combination, a rotor having a shaft, a plurality of self alining radial bearings for said rotor shaft and means comprising a thrust bearing and a flexible member for preventing end movement of said shaft in at least one direction.

7. In a vertical gyroscope, a bearing frame, a rotor, a hollow shaft for said rotor, radial bearings for said shaft, a member extending through said shaft and supporting adjacent its lower end said rotor shaft, and a thrust bearing for suspending said member from adjacent the top of said frame.

8. In a vertical gyroscope, a bearing frame, a rotor, a hollow shaft for said rotor, radial bearings for said shaft, a resilient member extending through said shaft and supporting adjacent its lower end said rotor shaft, and a thrust bearing for suspending said member from adjacent the top of said frame.

9. In combination, a rotor, a flexible rod for normally supporting the major portion of the weight of said rotor and a plurality of radial bearings for receiving the major portion of the rotational forces of said rotor.

10. In combination, a rotor having a shaft, and flexible means connected to the lower end of said shaft for supporting said rotor.

11. In combination, a rotor, a flexible member for normally supporting the major portion of the weight of said rotor, and a plurality of radial bearings positioned respectively on opposite sides of the rotor for receiving the major portion of the rotational forces thereof.

12. In combination, a bearing frame, a rotor, a hollow shaft for said rotor, self-alining radial bearings for said shaft, said bearings being positioned respectively on opposite sides of said rotor, a flexible rod extending into said shaft and supporting the latter, and a thrust bearing for suspending said member from adjacent the top of said frame.

13. In combination, a rotor having a hollow shaft, a flexible rod extending into said shaft, a plurality of self-alining radial bearings for said shaft on opposite sides of the rotor, each of said bearings comprising inner and outer races, rollers, a retainer for said rollers, one of said races having an annular depression forming a seat for the rollers while the corresponding face of the other race is straight, and a thrust bearing for supporting said flexible rod.

14. In combination, a rotor, a shaft therefor, a plurality of self-alining radial bearings for said shaft, a thrust bearing, and a flexible tension member suspended from said thrust bearing for supporting said shaft and said rotor.

In testimony whereof I have affixed my signature.

ELMER A. SPERRY.